Nov. 18, 1924.

T. V. BARNARD 1,516,135

CORN POPPER, NUT ROASTER, AND MIXER

Filed June 23, 1923    2 Sheets-Sheet 1

Inventor:
Cherides V. Barnard
Clarence A. O'Brien
Attorney.

Nov. 18, 1924.

T. V. BARNARD 1,516,135

CORN POPPER, NUT ROASTER, AND MIXER

Filed June 23, 1923   2 Sheets-Sheet 2

Inventor.
Cherides V. Barnard
Clarence A. O'Brien
Attorney.

Patented Nov. 18, 1924.

1,516,135

UNITED STATES PATENT OFFICE.

THERIDES V. BARNARD, OF SCHALLER, IOWA.

CORN POPPER, NUT ROASTER, AND MIXER.

Application filed June 23, 1923. Serial No. 647,407.

*To all whom it may concern:*

Be it known that I, THERIDES V. BARNARD, a citizen of the United States, residing at Schaller, in the county of Sac and State of Iowa, have invented certain new and useful Improvements in a Corn Popper, Nut Roaster, and Mixer, of which the following is a specification.

This invention relates to improvements in corn popping machines.

An object of the invention resides in providing a machine for popping corn, wherein a popping bowl is movably mounted in a suitable casing, having means for tilting the bowl to discharge popped corn therefrom, and means for containing and delivering predetermined quantities of corn and flavoring material to the popping bowl for a subsequent popping operation.

Another object of the invention resides in providing a popping machine of the character above mentioned provided with a tiltable popping bowl, a corn hopper, a flavoring container, and means for measuring and delivering predetermined quantities of corn and flavoring material to the popping bowl in the upright position to be popped therein, and subsequently delivered therefrom by the tilting of the container popping bowl in the casing for discharging the popped corn through a suitable discharge spout.

A further object of the invention resides in providing a tiltable popping bowl mounted in a suitable casing having a corn hopper and flavoring container mounted above the popping bowl in the casing, measuring and dispensing containers being provided above the popping bowl having communication with the hopper and flavoring container for receiving predetermined quantities of corn and flavoring material from said hopper and container, together with means for controlling the admission of corn and flavoring material from the hopper and container respectively into the measuring devices, as well as controlling the discharge of the material from the measuring devices into the popping bowl, said means also controlling the tilting of the popping bowl for discharging the popped and flavored corn therefrom through a suitable discharge opening in the casing.

The invention comprehends other objects and improvements in the details of construction and arrangement of the parts, which are more particularly described in the following detailed description and claims, directed to a preferred form of the invention, it being understood, however, that variations may be made in the specific construction and arrangement of these parts for carrying out the above objects without departing from the scope of the appended claims.

In the drawing, forming a part of this application:

Figure 3 is a detail sectional view, through the flavoring container and the measuring and discharge mechanism associated therewith.

Figure 4 is a detail view of the agitator for the popping bowl as shown in Figure 1.

Figures 5 and 6 are detail views, showing the manner in which the sections of a popping bowl may be secured together.

Figure 7 is a detail plan view, showing the neck of the popping bowl.

Figure 8 is a detail sectional view, showing the manner of forming bearings between the sections of the popping bowl for the agitator shaft.

Figure 1:
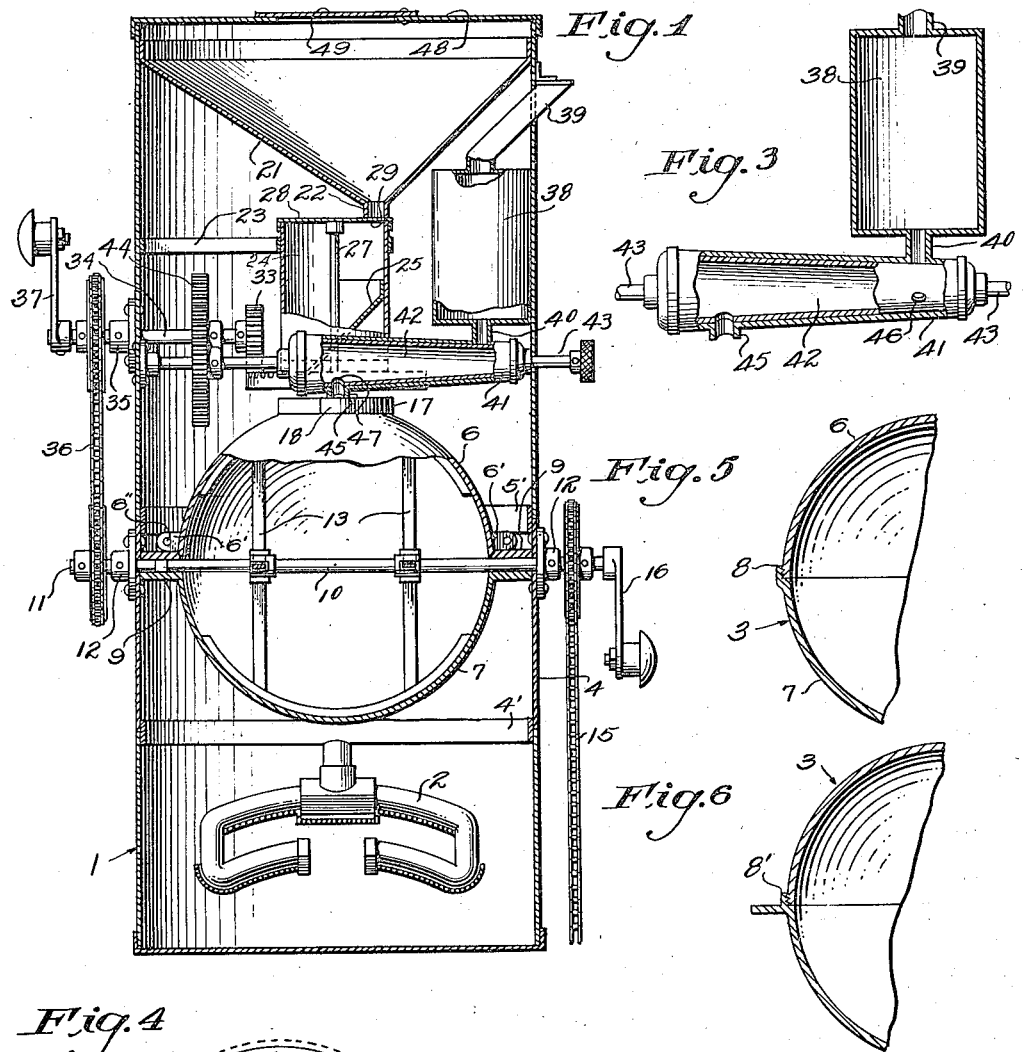
Figure 1 is a vertical sectional view through the popping machine forming the subject of this invention.

1 indicates the base portion of the container or casing of the popping machine, in which is mounted a suitable burner or the like indicated at 2, for heating the popping bowl 3, in the intermediate section 4, of the machine casing. The upper section of the casing, is indicated at 5, the upper and intermediate sections interfitting with each other and the lower section, in the manner as clearly shown in Figures 1 and 2, through the reduced ring connections 4' and 5' secured to the lower and intermediate sections, respectively, and forming projecting flanges for overlapping the inner lower edges of the upper and intermediate sections. The popping bowl 3 is substantially spherical in form, and composed of upper and lower semi-spherical sections 6 and 7, respectively, which may be interfitted and secured together in any suitable manner, such as indicated at 8, in Figure 5, wherein the upper section is formed with threads on the outer edge portion for cooperation with the threaded recessed portion of the lower section. In Figure 6, the lower bowl section 7 is formed with a radially projecting flange and a cylindrical extension, as indicated at 8' for receiving the edge of the upper section 7. The bowl sections 6 and 7 are provided at their interfitting edges and at diametrically opposite points thereof with cooperating bearing extensions 9, for receiving the agitator shaft 10 for rotation therein, and the operating shaft 11 is one of the bearings 9, the agitator shaft and the operating shaft 11 being in aligned relation as shown in Figure 1, and rotatably supporting the bowl relative to the casing, the shafts 10 and 11, being rotatably mounted in bearings 12, carried by the intermediate casing section 4. The upper bowl section as shown in Figure 1, is provided with ears 6' above the bearings 9, one of said ears being pivotally mounted in upwardly extending ears on the bearing indicated at 9' in Figure 8, while the other ear 6' is removably secured to ears 9' on the other bearing 9 by a suitable pin connection 6''. The upper bowl section may be swung on the hinge for opening the bowl, to provide access to the interior for cleaning or other purposes. It will be noted that the operating shaft 11 is relatively short and terminates in the central portion of one of the bearings 9 and the bowl, and is secured thereto for rotating said bowl in the rotation of the shaft, while the agitator shaft extends entirely through the portion of the bowl and terminates in the same bearing as the operating shaft 11 and adjacent the end thereof, radial arms 13 being mounted on the agitator shaft 10 within the bowl, and carrying scraper arms 14 of semi-circular form, adapted to cooperate with the inner surface of the bowl for constantly agitating the contents of the bowl during the popping operation, and further assisting the discharge of material from the bowl, as will be presently described. The agitator may be operated from a source of power through a chain drive indicated at 15, or by an operating handle 16. The upper bowl section 6 is formed with a substantially cylindrical neck 17, having a portion 18 extended outwardly at one side of the neck to provide a side passage 19 for a purpose to be described. This neck 17 provides an opening for discharging the material into the container to be popped and for discharging the popped material therein from the container by rotating the same to position the neck so that the agitator may push the material outwardly of the bowl and into a suitable discharge spout 20, shown in Figure 2.

The upper casing section 5 receives and mounts a hopper 21 for the corn to be popped, which inclines downwardly and is of substantially conical form, provided at the lower end with a depending spout 22 for discharging the corn from the hopper. A bracket 23 mounted on the interior of the casing 5 extends to the central portion of the casing and mounts a corn receiving and measuring receptacle 24, having an inclined partition wall 25 in the bottom portion thereof for directing the corn therein to the outlet opening 26 at one side of the bottom, said measuring receptacle rotatably carrying a shaft 27, secured to the cap 28 mounted on the receptacle 24 for relative rotation so that the opening 29 will register with the discharge spout 22 of the hopper, under predetermined conditions of operation, for permitting a charge of material from the hopper to fill the container 24. A disc 30 is rotatably mounted below the measuring container 24 on the shaft 27, and is provided with an opening 31 adapted to register with the opening 26 in the bottom of the container 25, to permit the discharge of the material in said container into the popping bowl through the neck 17. The periphery of the disc is is formed with a laterally projecting flange 32, forming a ring gear adapted to intermesh with the pinion 33 on a shaft 34 rotatably mounted in a bearing 35, in the upper casing section 5, the outer end of this shaft 34 being provided beyond the casing with a suitable chain and sprocket drive 36, connected with the shaft 11, so that a rotation of the shaft 34 will effect the rotation of the operating shaft 11, and a corresponding movement of the popping bowl 3, the free end of the shaft 34 receiving a handle 37 to provide for the manual operation of the shaft 34.

A flavoring container 38 is mounted in one side of the upper section 5 of the casing, as clearly shown in Figure 1, and is provided with a filling pipe 39, extending through an opening in the upper section of the casing, so that the container 38 may be filled with a suitable flavoring substance. The bottom end of the container 38 is provided with a discharge neck 40, carrying a casing 41 at the lower end thereof extending transversely of the casing section 5, cylindrical in cross section and tapering lengthwise. The casing 41 receives a measuring member 42, for relative rotation therein, also of cylindrical cross section and tapered lengthwise, and having shaft extensions 43 extending through the casing 41 and rotatably mounted in suitable bearings in the upper section 5 of the casing, one of the shaft extensions 43 and the shaft 34 being provided with suitable intermeshing gears 44 for rotating the member 42 in the rotation of the shaft 34. The casing 41 is provided at the enlarged end remote from the container 38 with a discharge spout 45, which is positioned directly over the extending portion 18 of the hopper, so that the flavoring material discharged through the spout 45 enters the hopper through the passage 19. The measuring member 42 is provided with openings 46 and 47 adapted to register with the outlet spout 40 of the container 38 and the discharge spout 45 of the casing 41 respectively, the openings being arranged so that they will not register with their respective spouts simultaneously. A suitable cover is provided as indicated at 48 for the upper open end of the casing section 5, having an opening in the central portion thereof closed by a hinged cover section 49, to permit the replenishing of the supply of corn in the hopper 21.

Figure 2:
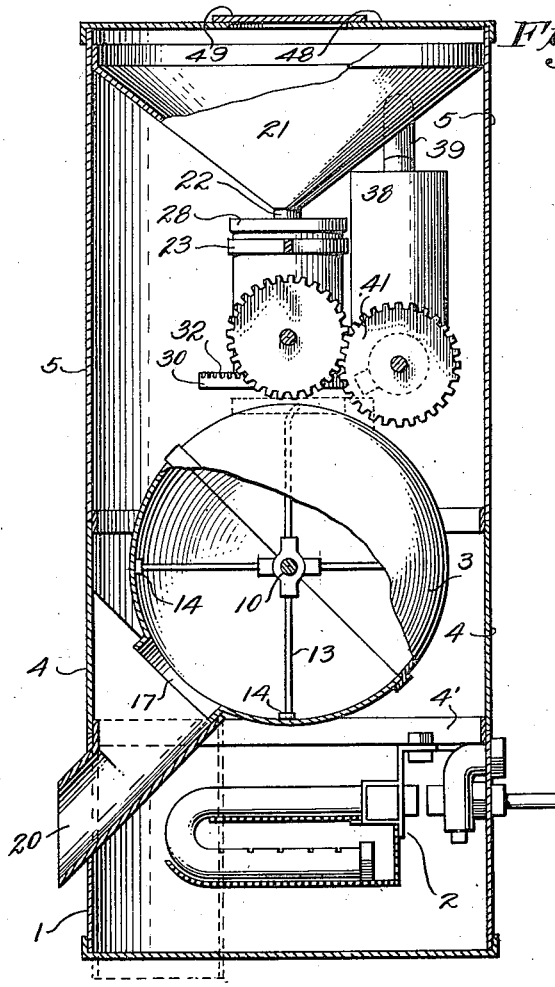
Figure 2 is a vertical sectional view through the casing, showing portions of the popping bowl and the hopper in section, and showing the popping bowl in discharging relation, with the discharge spout in the casing.
Figure 9:
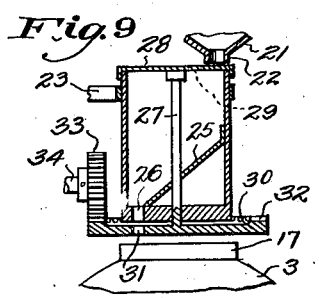
Figure 9 is a detail sectional view, through the corn measuring and dispensing device.

In the operation of the machine, shown more particularly in Figures 1 and 2, the rotation of the handles 37 for rotating the shaft 34, will effect an operation of the shaft 11 for rotating the bowl 3, to move the discharge spout from the upper position shown in Figure 1, to the position shown in Figure 2, for discharging the material from the bowl, in a manner which may be clearly ascertained from Figure 2 into the discharge spout 20. In this operation, the shaft 34 rotates the disc 30 for moving the opening 31 out of alignment with the opening 26 in the receptacle 24, and for rotating the cover 28 to position the opening 29 in alignment with the discharge spout 22 of the hopper for permitting a charge of corn from the hopper to enter the receptacle 24, and completely fill the same. At this time, the intermeshing gears 44 rotate one of the shaft projections 43 and the member 42, to move the opening 47 out of alignment with the discharge spout 45 and to move the opening 46 into alignment with the spout 40 of the container 38, so that a discharge of flavoring material may be supplied to the measuring member 42, for completely filling the same. While the bowl is in the position shown in Figure 2 for discharging the material into the spout 20, an operation of the agitator through the rotation of the shaft 10 will effectively discharge all of the material therein, the subsequent operation of the handle 37 effecting a rotation of the shaft 34, and the operating shaft 11 for restoring the parts to the position shown in Figure 1. At this time, the neck 17 will be positioned so that the channel or passage 19 is directly under the spout 45, while the neck 17 is under the opening 26 of the receptacle 24. The rotation of the shaft 34 and the shaft 43 will effect a corresponding rotation of the disc 30 in the measuring member 42, so that the opening 29 of the cover will move out of registry with the depending spout 22 of the hopper, and the opening 46 will move out of registry with the discharge spout 40 of the container 38, so that the supply of material to each of these measuring devices will be closed. As the neck is positioned in the position shown in Figure 1, the disc 30 will assume the position shown in Figure 9, with the opening 31 therein aligned with the opening 26, to permit the discharge of the material or corn in the receptacle 24 into the bowl through the neck 17, while the opening 47 of the measuring member 42 will be positioned to register with the discharge spout 45 of the casing 41, so that the flavoring material will also be discharged from the measuring member, through the channel 19 and also into the bowl, following which an operation of the agitator shaft 10 will constantly agitate the material discharged into the bowl, while the same is being heated by the burner 2 to pop the corn, which will take up the flavoring substance discharged into the bowl, and will effectively mix the popcorn and the flavoring substance, in order to provide completely popped and flavored corn, following which the above discharge operation is again repeated, discharging the popped material through the discharge spout 20.

It will be seen from the above description that an assembled corn popping machine has been provided, wherein the popping bowl is movably mounted in a casing, so that in one position the neck thereof is extended above the major portion of the bowl for receiving a predetermined charge of corn and flavoring material from measuring and delivering devices, which are supplied from suitable hoppers and containers, the corn being popped and flavored in the bowl which contains suitable agitating means, and following which operating means controls the operation of the bowl and the measuring and discharge devices will operate the bowl to discharge the popped corn therefrom, and at the same time operates the measuring devices to receive a discharge of material for subsequent delivery to the bowl.

It is to be noted, in this connection, that the main casing for the machine is formed of a plurality of disengageable sections which permits the removal of the parts from one another for cleaning purposes or for renewal of the parts.

What is claimed is:

1. A pop corn machine comprising a housing, a tiltable popping bowl in said housing, a corn hopper, a flavoring container, measuring and delivering means between the corn hopper and flavoring container and the popping bowl, and means for tilting the popping bowl for discharging popped corn therefrom, said means operating the measuring and delivering means for receiving a charge of corn and flavoring material from the hopper and container for subsequent delivery to the popping bowl after the discharge operation.

2. A pop corn machine comprising a casing, a tiltable popping bowl mounted in said casing, means for containing and delivering predetermined quantities of corn to said popping bowl, and means for tilting the popping bowl to discharge popped material therefrom, and for controlling the containing and delivering means to prevent the discharge of material during the discharge of the popped material from the bowl.

3. A pop corn machine comprising a casing, a tiltable popping bowl mounted in said casing having a neck portion normally projecting upwardly from the bowl in the popping operation of the machine, and tiltable for discharging popped material therefrom, containers for material mounted above the popping bowl and in the casing, receiving, measuring and discharging means between the material containers and the bowl, for receiving, measuring, and discharging predetermined quantities of material from the containers into the bowl, and means for controlling the operation of the receiving, measuring and controlling means and the tilting of the bowl, said means operating to permit a quantity of material to be received and measured in said means from said material containers during the discharge of material from the bowl, and for delivering said measured material to the bowl when the neck is returned to the upwardly projected position.

4. A pop corn machine comprising a casing, a substantially spherical popping bowl rotatably mounted in said casing, means carried by the casing for agitating the contents of the bowl, said bowl having a neck extending therefrom and normally projecting upwardly during the popping operation, a corn hopper mounted in the upper end of the casing above the bowl, a flavoring container mounted adjacent said corn hopper, measuring receptacles connected with said hopper and container, and adapted to receive material therefrom to be measured, said receptacle having discharge spout registering with the neck of said bowl, and means for controlling the entrance of material from the hopper and flavoring container to said measuring receptacle to control the discharge of material from said receptacles, and for rotating the bowl to position the neck for the discharge of material from the bowl, said means permitting the entrance of material from the corn hopper and flavoring container to said measuring devices during the discharge of material from the bowl, and permitting the discharge of measured material from the measuring receptacles in said bowl when the neck is in an upwardly projected position.

5. A pop corn machine comprising a casing, a tiltable popping bowl mounted in the container, adapted to be tilted for discharge of material therefrom, the corn hopper mounted in said casing, a flavoring container mounted in said casing, adjacent the corn hopper, independent measuring means mounted under the corn hopper and flavoring container respectively, for receiving material therefrom, said independent means having discharge outlets for discharging material therein into the bowl, and manually operated means for controlling the tilting of the bowl in the operation of said independent means for measuring the material from the hopper and container.

6. A pop corn machine, comprising a casing, a tiltable popping bowl mounted in said casing formed with an open neck portion and adapted to be tilted to discharge the material therefrom, a corn hopper mounted above said bowl and in the casing, a flavoring container mounted in said casing adjacent the bowl, a tapered casing connected with said flavoring container and having a discharge spout positioned over said neck of the popping bowl, a measuring container rotatably mounted in said casing and adapted to control the connection with said measuring container and the outlet spout, a measuring receptacle mounted above the neck of the bowl and adapted to receive corn from said hopper, a pair of rotatable discs above and below said measuring receptacle for governing the admission of material thereto and the discharge of material therefrom, and manually operated means for rotating said measuring member and said disc members and for controlling the filling of said bowl.

THERIDES V. BARNARD.